Nov. 8, 1955     H. HEINE     2,722,863

PHASE MICROSCOPE

Filed Jan. 30, 1952     2 Sheets-Sheet 1

INVENTOR.
Hermann Heine
BY Klein + Hart
his attorneys

Nov. 8, 1955  H. HEINE  2,722,863
PHASE MICROSCOPE
Filed Jan. 30, 1952  2 Sheets-Sheet 2

INVENTOR.
Hermann Heine
BY Klein + Hart
his attorneys.

United States Patent Office 2,722,863
Patented Nov. 8, 1955

2,722,863

PHASE MICROSCOPE

Hermann Heine, Wetzlar, Germany, assignor to Ernst Leitz G. m. b. H., Wetzlar, Germany, a corporation of Germany Application January 30, 1952, Serial No. 268,996

Claims priority, application Germany February 8, 1951

16 Claims. (Cl. 88—39)

The present invention relates to phase microscopes, and more particularly to an arrangement for microscopically observing objects in phase contrast and color.

In my co-pending application Serial No. 135,510, filed December 28, 1949, now U. S. Patent No. 2,674,157, I have proposed a phase microscope which comprises a condenser producing an annular caustic which is projected into the proximity of the rear focal plane of the objective, and by moving the condenser along the optical axis of the microscope, the scale of the annular caustic image in the proximity of the rear focal plane can be changed.

It has further been proposed to combine an arrangement wherein the light source consists of a more or less narrow annulus with a conventional phase plate having an annular phase layer to permit the projection of the annular light-source image into the space outside said phase layer by moving the condenser along the optical axis of the microscope.

The arrangement of an annular illumination source for the microscope, the distance of which from the object is changeable, has proved to be especially suitable for phase contrast observation in color. In one arrangement, the annular diaphragm conventionally positioned in the lower focal plane of the condenser has been replaced by a color filter consisting of a colored ring embedded in a differently colored substance, the colored ring being projected accurately onto the phase layer positioned in the exit pupil of the objective.

The present invention proposes a phase microscope having at least two, preferably concentric, differently colored or differently polarized annular illumination sources, said annuli being produced at a finite, adjustable distance from the depicting objective.

According to the invention, the illumination annuli are preferably produced by condensers adapted to condense the incident light into annular foci, one such condenser being surrounded by another annular condenser having the same properties and said light annuli being of different color or polarizaton. The condensers can be mounted in such manner as to be movable together or separately along the optical axis of the microscope.

In a preferred embodiment of the invention, the socket which holds the condensers and a collector lens comprises means for supporting therein diaphragms, color-filters or polarization folios.

Figure 1:
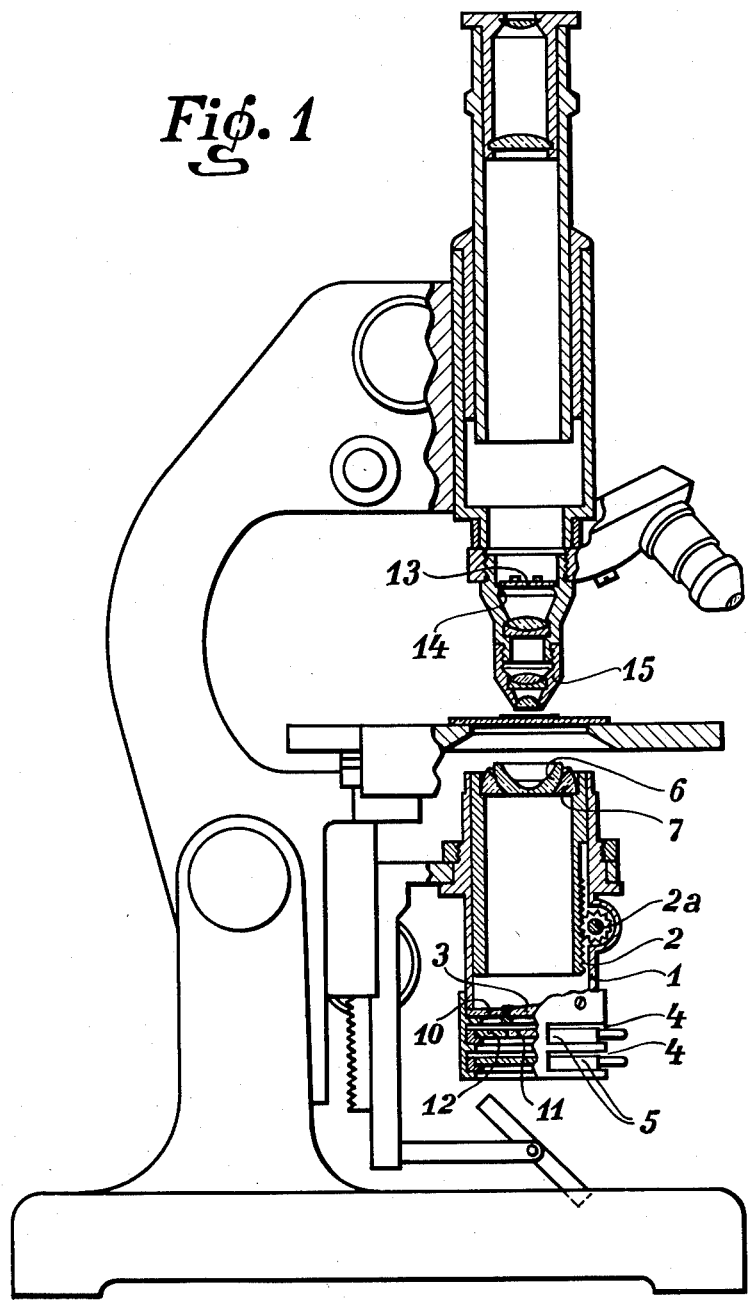
Figure 2:
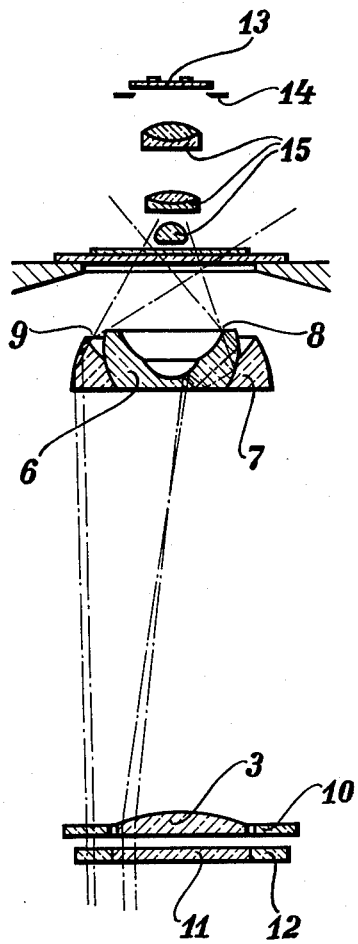
Figure 3:
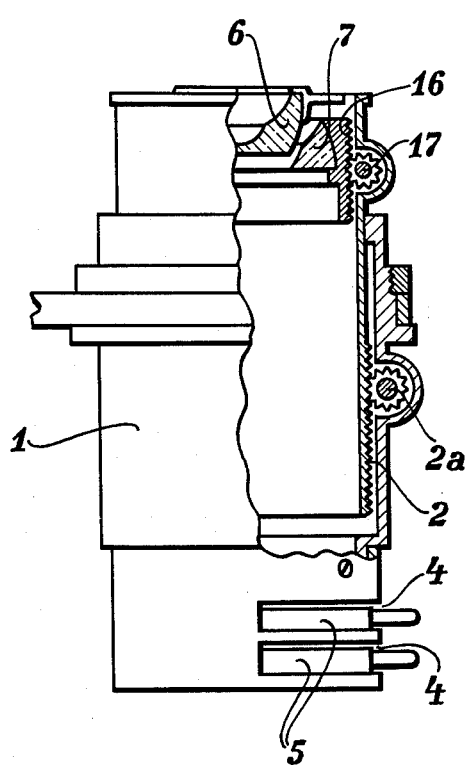

The above features and advantages of the present invention will become more apparent from the following detailed description taken in connection with the accompanying drawing which is illustrative of the invention, without limiting the same to the specific features shown, and wherein Fig. 1 is a partly-sectional view of the phase microscope according to the invention;

Fig. 2 shows the path of the incident light rays through the condensers and the object; and Fig. 3 shows an alternate arrangement for separate axial movement of the two condensers.

Referring now to the drawing, there is shown a socket 1 which can be moved along the optical axis of the microscope by means of a tooth and ratchet arrangement 2, 2a. The socket holds at its lower end a collector lens 3 and at its upper end concentric condensers 6 and 7. Condenser 7 is of annular shape and surrounds condenser 6. Slots 4 are adapted to receive changeable color filters, diaphragms or polarizers 5. The elements 5 are color filters, diaphragms or polarizers. Color filters are used when a colored phase contrast is desired, and the polarizers are used when double refracting objects, such as crystals or anisotropic structures such as bacteria are observed. The polarizers have a suitable shape, for example the shape of a circular disc to polarize the central light bundle passing through lens 3, or the shape of an annular ring to polarize the light bundle passing through glass ring 10. By employing the diaphragms, one of the colors or the effect of polarization may temporarily be eliminated. Thus, the use of diaphragms allows the rapid changing from one type of light to another, this being advantageous for the determining of the characteristics of the objects to be observed.

The path of the rays, shown in Fig. 2, illustrates that each of the two condensers 6 and 7 condenses the incident light rays into annular caustics 8 and 9, in contrast to the conventional microscope condensers which focus the light rays in the object. In the embodiment illustrated, the condenser 6 performs this function on slightly converging light, the outer condenser 7 on parallel light which enters through an aperture covered by glass ring 10.

As shown, the color filter 5 consists of an inner circular part 11 of one color and an annulus 12 of another color.

The means for supporting the color filters, the diaphragms or the polarizers may alternately comprise a revolving disc mounted on the lower end of the socket.

The arrangement according to the present invention allows different modes of observations, of which the following are described in more detail, by way of example:

1. A color filter supporting means, comprising, for example, a red ring 12 and an inner green circle 11 is inserted in the microscope socket. Inner condenser 6 then forms a green annular caustic and the outer condenser 7 forms an analogous red light sources of greater diameter. If a conventional phase layer 13 is positioned in the exit pupil 14 of the microscope objective 15, the condensers can be moved along the optical axis of the microscope in such manner that the green illumination ring is projected on the phase layer and the red ring is projected outside said phase layer. A green phase-contrast image together with a red bright-field image without phase contrast are therefore obtained.

When the condensers are simultaneously brought closer to the microscope objective, both annular images grow in the plane of the phase layer. Therefore, the outer red image can be made so large that it falls partly upon the limits of the exit pupil of the objective, for instance a diaphragm. Thus, the intensity of the red light can be reduced and, accordingly, the ratio of the two colors in their mixture changed. If the green image is sufficiently narrow, it moves during the displacement of the condensers over the plane of the phase layer without leaving it; otherwise only the outer condenser is moved by means of the tooth and ratchet arrangement 16, 17 and 2, 2a.

2. If the red light is projected completely behind the objective diaphragm, a phase contrast image in green and a pure dark-field image in red are obtained, the images being superimposed on each other. In this case, the intensity of the green bright-field image usually predominates over the red dark-field image to such an extent that only the bright-field image can be seen. If a circular diaphragm is positioned in one of slots 4, the green light can be eliminated in that the surface 11 is covered and only the red dark-field image will be seen. It is therefore possible to choose between the bright- and dark-field by simply inserting or removing said diaphragm.

3. If the red illumination is an annular caustic as described hereinabove, a red phase contrast image, which is superimposed on the green phase contrast image, is obtained by partly covering the red ring in the exit pupil of the microscope objective. Thus, a positive contrast image of the one color may be superimposed on the negative contrast image of the other color.

4. It is further possible to have a different phase layer for each other.

What is claimed is:

1. In a phase microscope comprising an objective with an exit pupil and at least one phase plate in the exit pupil: an arrangement for observing objects in phase contrast including means for producing at least two annular caustics having different light characteristics, and means for adjusting the distance of the annular caustics from the objective, images of the annular caustics being projected by the objective in the exit pupil and the image size being varied in accordance with said distance.

2. Arrangement as defined in claim 1, wherein said first-mentioned means are adapted to produce annular caustics of different color.

3. Arrangement as defined in claim 1, wherein said first-mentioned means are adapted to produce annular caustics of differently polarized light.

4. In a phase microscope comprising an objective with an exit pupil and a phase plate in the exit pupil: an arrangement for observing objects in phase contrast and color including means for producing two annular caustics of different color positioned in the optical axis, the object being inserted between the annular caustics and the objective, and means for adjusting the distance of the annular caustics from the object and objective, images of the annular caustics being projected by the objective in the exit pupil and the image size being varied in accordance with said distance.

5. In a phase microscope comprising an objective with an exit pupil and a phase plate in the exit pupil: an arrangement for observing objects in phase contrast including means for producing two annular caustics of differently polarized light positioned in the optical axis of the microscope, the object being inserted between the annular caustics and the objective, and means for adjusting the distance of the annular caustics from the object and objective, images of the annular caustics being projected by the objective in the exit pupil and the image size being varied in accordance with said distance.

6. In a phase microscope comprising an objective with an exit pupil and at least one phase plate in the exit pupil: an arrangement for observing objects in phase contrast including two concentrically arranged condensers, each of said condensers having reflecting and focusing means for forming incident light into an annular caustic, the incident light entering one condenser and the incident light entering the other condenser having different light characteristics, and means for adjusting the distance of the condensers from the objective, images of the annular caustics being projected by the objective in the exit pupil and the image size being varied in accordance with said distance.

7. Arrangement as defined in claim 6, wherein the incident light entering one condenser is of different color from the incident light entering the other condenser.

8. Arrangement as defined in claim 7, comprising color filters between a light source and said condensers to impart to the incident light said different colors.

9. Arrangement as defined in claim 6, wherein the incident light entering one condenser is differently polarized than the incident light entering the other condenser.

10. Arrangement as defined in claim 9, comprising polarizing means between a light source and said condensers to impart to the incident light different polarization.

11. In a phase microscope comprising an objective with an exit pupil and a phase plate in the exit pupil: an arrangement for observing objects in phase contrast and color including a first condenser, a second annular condenser concentrically surrounding the first condenser, reflecting and focusing means in each of said condensers for forming incident light into an annular caustic, means for imparting a predetermined color to the incident light entering one condenser and another color to the incident light entering the other condenser, and means for adjusting the distance of the condensers from the objective, images of the annular caustics being projected by the objective in the exit pupil and the image size being varied in accordance with said distance.

12. In a phase microscope comprising an objective with an exit pupil and a phase plate in the exit pupil: an arrangement for observing objects in phase contrast including a first condenser, a second annular condenser concentrically surrounding the first condenser, reflecting and focusing means in each of said condensers for forming incident light into an annular caustic, means for imparting a predetermined polarization to the incident light entering one condenser and another polarization to the incident light entering the other condenser, and means for adjusting the distance of the condensers from the objectives, images of the annular caustics being projected by the objective in the exit pupil and the image size being varied in accordance with said distance.

13. Arrangement as defined in claim 11, wherein said means for adjusting the distance of the condensers from the objectives is adapted to move the condensers together.

14. Arrangement as defined in claim 11, wherein the distance of the condensers from the objective is adjustable separately.

15. Arrangement as defined in claim 11, wherein said means for imparting color to the incident light comprises color filters and a support member, said support member having means to position exchangeable filters therein.

16. Arrangement as defined in claim 12, wherein said means for polarizing the incident light comprises polarizers and a support member, said support member having means to position exchangeable polarizers therein.

References Cited in the file of this patent

UNITED STATES PATENTS

| | | |
|---|---|---|
| 1,985,074 | Bauersfeld | Dec. 18, 1934 |
| 2,427,689 | Osterberg et al. | Sept. 23, 1947 |
| 2,594,757 | Fischer | Apr. 29, 1952 |

FOREIGN PATENTS

| | | |
|---|---|---|
| 948,408 | France | Jan. 31, 1949 |
| 1,002,593 | France | Nov. 7, 1951 |